Feb. 29, 1944.  H. OTTINGER  2,343,022
MEANS FOR COOLING AND LUBRICATING MANDREL BARS
Filed Oct. 17, 1941  2 Sheets-Sheet 2
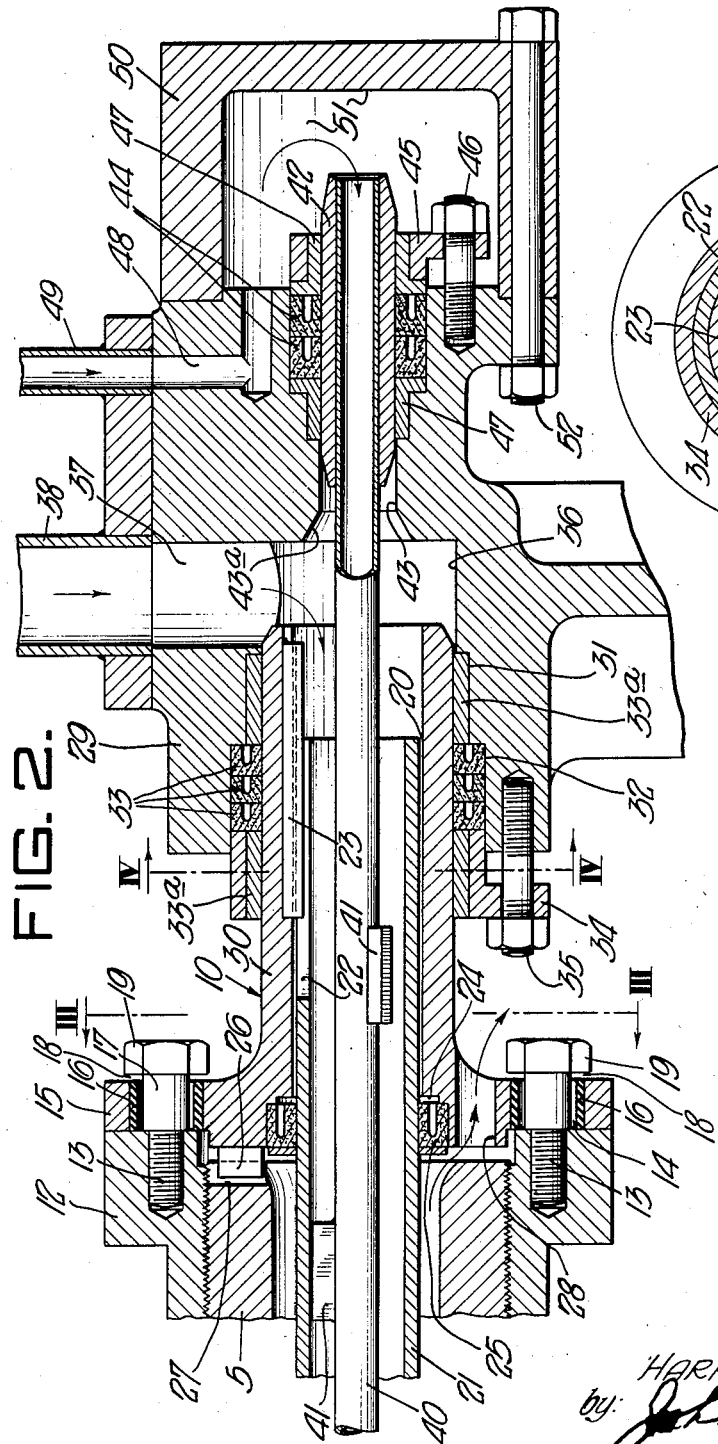
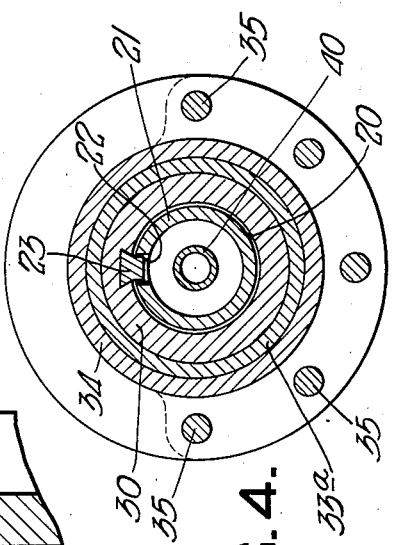
Inventor:
HARRY OTTINGER,
by John E. Jackson
his Attorney.

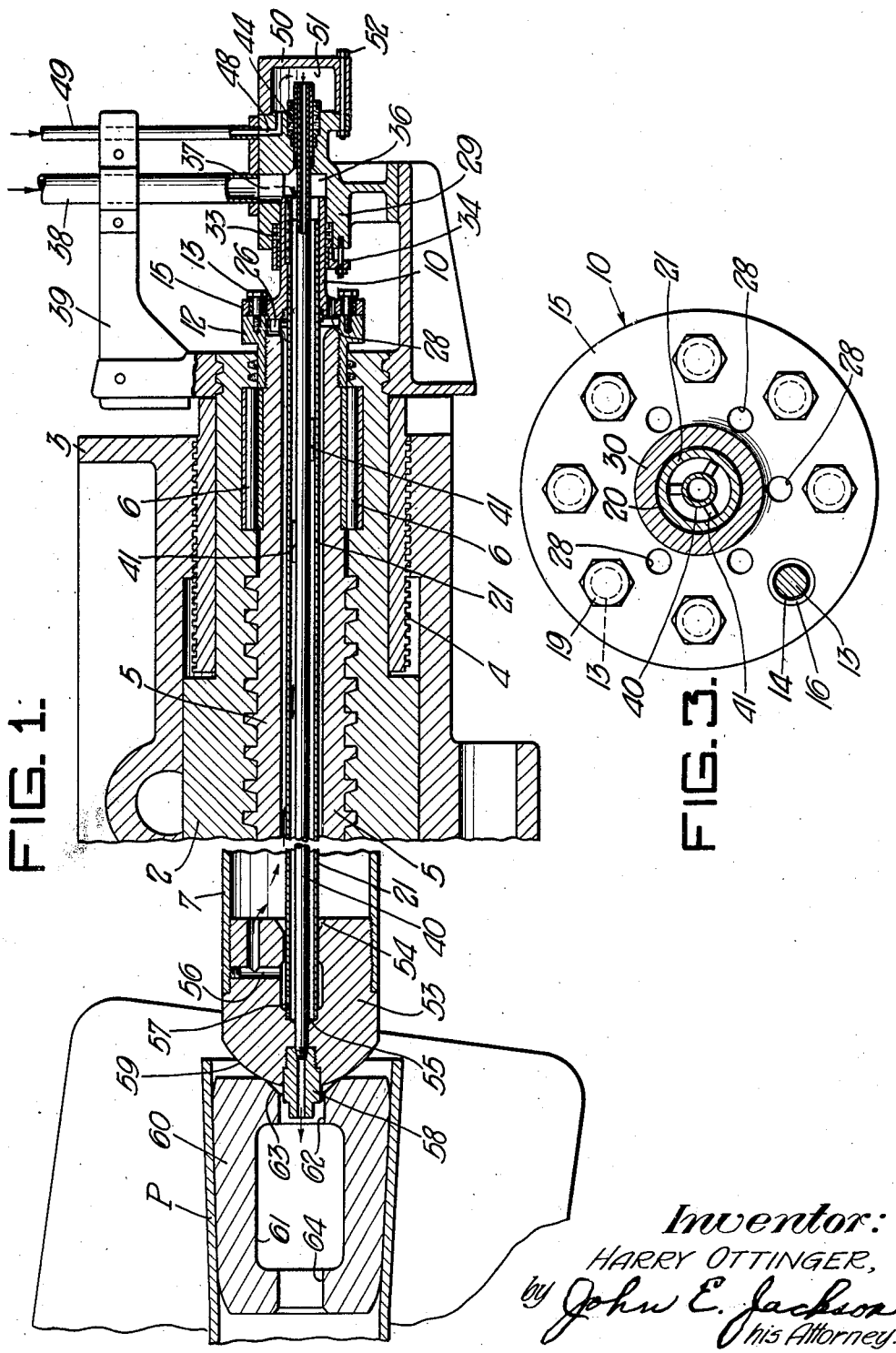

Patented Feb. 29, 1944

2,343,022

UNITED STATES PATENT OFFICE 2,343,022

MEANS FOR COOLING AND LUBRICATING MANDREL BARS

Harry Ottinger, McKeesport, Pa., assignor to National Tube Company, a corporation of New Jersey Application October 17, 1941, Serial No. 415,482

11 Claims. (Cl. 80—13)

This invention relates to rotating mandrel bars and, particularly, to an improved means for supplying a cooling fluid to the interior of mandrel bars and a lubricant to the interior of the pipe or other tubular workpiece.

Various means and devices have been suggested and used for introducing a cooling fluid, together with a lubricant, into rotating mandrel bars and the like for the purpose of maintaining the mandrel bars at a relatively cool temperature during the use thereof and to lubricate the interior of the pipe or workpiece. Such means or devices usually employ fluid and lubricant conveying pipes for introducing the cooling fluid, usually water, and the lubricant into and through the mandrel bars. It is necessary that these pipes be replaced from time to time, due to the wear and corrosion thereof, so it is important that they be assembled in the mandrel bars in a most convenient manner to thus expedite their replacement. A number of different ways have been used for assembling these pipes in the mandrel bars, but most of them have been impractical and expensive and too much time was required for replacement; also, these pipes, in most cases, were subjected to excessive wear due to the manner in which they were assembled in the mandrel bars, necessitating quite frequent replacements, which was inconvenient as well as expensive.

Furthermore, where the pipes are assembled in a rotating mandrel, there is usually provided a stuffing box or similar means for housing the inner end of the pipes whereby the cooling fluid and lubricant are supplied to the pipes to be conveyed to the interior of the mandrel bar. It will be understood that the piercing and reeling apparatus used in the manufacture of pipe and the like are subject to extremely heavy loads and severe stresses. In such apparatus the thrust block and mandrel bar travel back and forth quite rapidly and the mandrel bar and supporting spindle rotate under load and, while under such axial load, are subject to deflection. As a result, the axial alignment between the stuffing box and the rotating spindle is difficult to maintain, thereby oftentimes resulting in a rupture or breakage of the pipes or the pipe supporting means between the stuffing box and the spindle, which, of course, is unsatisfactory and disadvantageous.

Accordingly, it is the general object of the present invention to provide an improved means for assembling and supporting cooling fluid and lubricant conveying pipes within a rotating mandrel bar whereby the above named disadvantages are eliminated.

It is another object of the invention to provide an improved means for assembling and supporting cooling fluid and lubricant conveying pipes within a rotating mandrel bar so that both the cooling and lubricant pipes rotate therewith and, at the same time, an assembly which permits the pipes to move relative to the mandrel bar, thereby eliminating the danger of bending or the breakage of the pipes and pipe supporting member.

It is a further object of this invention to provide a yieldable means for supporting the cooling fluid and lubricant conveying pipes in a rotating mandrel bar so as to permit movement of the same relative thereto whereby the pipes are maintained substantially centrally of the mandrel bar at all times.

It is still another object of the present invention to provide an improved means for assembling cooling fluid and lubricant conveying pipes in a rotating mandrel bar by which the pipes can easily and conveniently be replaced in a relatively short time.

It is still a further object of this invention to provide an improved means for assembling and supporting cooling fluid and lubricant conveying pipes within a rotating mandrel bar which is rugged and strong and, at the same time, simple and inexpensive in its construction.

It is another object of the present invention to provide an improved means for assembling the piercing or reeling plug on the end of the mandrel bar and, at the same time, to supply a lubricant thereto.

Various other objects and advantages of this invention will be more apparent in the course of the following specification and will be particularly pointed out in the appended claims.

In the accompanying drawings there is shown, for the purpose of illustration, one embodiment which my invention may assume in practice.

In these drawings:

Figure 1 is a longitudinal section through a mandrel bar assembly showing the improved cooling and lubricating means of my invention incorporated therewith;

Figure 2 is a similar enlarged section of the inner end of the assembly as shown in Figure 1, showing more fully the details of the improved cooling and lubricating means of my invention;

Figure 3 is a section taken on line III—III of Figure 2; and

Figure 4 is a section taken on line IV—IV of Figure 2.

Referring more particularly to the drawings, there is shown for the purpose of illustration merely the inner end structure of a conventional type of piercing or reeling apparatus as used in the manufacture of pipe and other tubular articles, which apparatus is well known to those skilled in the art, and with which the improved cooling means of the present invention is shown incorporated. Such apparatus consists generally of a cylindrical housing 2 disposed in a movable carriage or thrust block 3. There is arranged adjacent the inner end of the housing 2 and around the periphery thereof a threaded portion 4 which cooperates with a similar threaded portion arranged on the inner wall of the carriage 3 so as to securely position the same therein and to provide a means for adjusting the same relative to the housing.

There is disposed axially of the cylindrical housing 2, a rotatable hollow spindle 5 which is mounted in suitable bearings 6 carried by the housing. There is suitably arranged on the forward or outer end of the spindle 5 beyond the housing 2, in a well known manner, a hollow mandrel bar 7 over which the pipe or tubular workpiece is adapted to pass.

According to the present invention, as is more fully shown in Figure 2 of the drawings, there is arranged on the inner end of the rotatable spindle 5 a supporting member 10 which is preferably attached to a spindle nut 12 by means of cap screws 13 extending through holes 14 arranged through and around a flange 15 of the supporting member 10. There is positioned within each of the holes 14 a bushing or buffer member 16 which is made preferably from a yieldable material, such as rubber and the like. Each of the cap screws 13 preferably has a body or unthreaded portion 17 of such length that there is provided a space 18 between the head 19 thereof and the outer face of the flange 15 of the supporting member 10, as shown in Figure 2, so as to permit the supporting member 10 to move relative to the spindle 5 and the mandrel bar 7 carried thereby.

There is arranged through the supporting member 10 an axial opening 20 in which there is loosely and removably disposed a longitudinally extending cooling fluid conveying pipe 21 which extends through the spindle 5 into the mandrel bar 7 to the outer end thereof. On the inner end of the cooling pipe 21 there is arranged preferably a slotted opening or keyway 22 in which an elongated key 23, securely carried by the supporting member 10 in the axial opening 20 thereof, is adapted to be disposed so that the cooling fluid pipe will be rotated thereby when the spindle, together with the mandrel bar and supporting member carried thereby rotate. The inner end of the axial opening 20 in the supporting member is preferably counter-bored as at 24 and there is disposed therein an annular U-shaped gasket 25 preferably made of a yieldable material, such as rubber and the like, which fits tightly around the exterior of the cooling fluid pipe 21 so as to prevent leakage of the cooling fluid from between the cooling pipe and the supporting member. On the inner end of the supporting member 10 there is disposed preferably a plurality of outwardly extending lugs 26 which fit into recesses 27 arranged in the inner end of the spindle 5 whereby the supporting member is positively rotated by the spindle upon rotation thereof. There is arranged around and extending through the flange 15 of the supporting member 10 a plurality of openings or passageways 28 for a purpose hereinafter to be described. It will be understood that the outer diameter of the cooling fluid conveying pipe 21 is substantially smaller than the inner diameter of the axial opening 20 and both the hole through the spindle 5 and the mandrel bar 7 so as to provide a space therebetween.

There is positioned adjacent the inner end of the spindle 5 a stuffing box 29 in which an outwardly extending cylindrical portion 30 of the supporting member 10 is rotatably disposed. The inner end of the opening 31 is preferably enlarged or counter-bored, as at 32, so as to provide a space around the outwardly extending portion 30 of the supporting member. There is positioned in the counter-bored portion 32 preferably a plurality of gaskets or packing members 33, three in the present instance, preferably made from a yieldable material such as rubber and the like, and which have preferably a U-shaped cross-section. The gaskets 33 are held in position therein preferably by means of an annular bracket or gland-like member 34 which is held in engagement with the body of the stuffing box 29 preferably by means of stud bolts 35. It will be understood that the gaskets 33 fit tightly around the exterior surface of the outwardly extending portion 30 of the supporting member and that it is the purpose of the same to prevent leakage of the cooling fluid from between the supporting member and the stuffing box. On either side of the gaskets 33 there is provided preferably an oilless bushing 33ª which contacts the outer surface of the outwardly extending portion 30 of the supporting member 10 and which bushings are adapted to act as bearings therefor.

There is arranged within the stuffing box 29 an opening or passageway 36 which extends from an inlet connection 37 to the inner end of the axial opening 20 and the cooling fluid pipe 21 carried thereby. There is provided preferably an inlet pipe 38, or other suitable fluid conveying means, having one end thereof connected to the inlet connection 37 of passageway 36 with the opposite end thereof connected to a suitable source of cooling fluid supply (not shown). The inlet pipe 38 is preferably supported by means of a clamp or bracket 39 arranged on the inner end of the housing 2.

There is disposed within the cooling fluid pipe 21 a longitudinally extending lubricant conveying pipe 40 having an outer diameter substantially smaller than that of the inner diameter of the cooling fluid pipe 21 so as to provide a space therebetween. There is arranged around the outer periphery of the lubricant pipe 40 throughout the length thereof a plurality of spaced apart lugs 41 for centering the lubricant pipe within the cooling fluid pipe. It will be seen that this lubricant conveying pipe extends through the supporting member 10 and the spindle 5 to the outer end of the mandrel bar 7 and is adapted to rotate therewith. The inner end of the lubricant pipe 40 extends beyond the end of the supporting member 10 and the cooling pipe 21 into and through the stuffing box 29.

Around the extreme inner end of the lubricant pipe 40 there is securely arranged a sleeve 42 which is disposed in an opening 43 arranged axially with the lubricant pipe 40 in the stuffing box 29. The inner end of the opening 43 is preferably threaded or outwardly flared as at 43ª.

There is positioned in the stuffing box around the sleeve 42 and the end of the pipe 40 a plurality of U-shaped gaskets or packing members 44, two in the present instance, similar to the gaskets 33, and which are adapted to prevent leakage of the lubricant around the end of the pipe 40. There is provided a bracket or gland-like member 45 for maintaining the gaskets 44 in position and which is held in engagement with the body of the stuffing box preferably by means of stud bolts 46. There is also provided on either side of the gaskets 44 preferably an oilless bushing-like member 47 for direct contact with the sleeve 42 carried by the pipe 40, adapted to act as bearings for the sleeve and the lubricant pipe arranged therewith.

There is arranged within the stuffing box 29 another passageway 48 which extends preferably from the top of the stuffing box to the outer side thereof. The top of the passageway 48 is connected to a lubricant supply pipe 49 which, in turn, is connected to a suitable source of lubricant supply (not shown). On the outer end of the stuffing box 29 there is mounted a cover or housing 50 having a chamber 51 arranged therein which communicates with the end of the passageway 48 in the stuffing box and the inner end of the lubricant conveying pipe 40. The cover or housing 50 is held in engagement with the stuffing box preferably by means of a bolt 52.

In the outer end of the mandrel bar 7, as shown in Figure 1 of the drawings, there is mounted a mandrel bar cap member 53 having an axial opening 54 arranged therethrough. The outer end of the cooling fluid conveying pipe 21 extends into the axial opening 54 of the cap member with the end thereof preferably abutting against a shoulder 55 therein so as to close that end of the cooling fluid pipe. There are arranged within the bar cap member 53 passageways 56 which communicate with the space between the cooling fluid pipe and the inner wall of the mandrel bar. There is arranged in the walls of the cooling fluid pipe 21 adjacent the outer end thereof a plurality of openings 57 which communicate with the passageways 56 of the bar cap member 53.

The outer end of the lubricant conveying pipe 40 extends through the axial opening 54 beyond the end of the cooling fluid pipe 21 and there is disposed on the extreme outer end of the lubricant pipe and in the outer side of the bar cap member 53 a nozzle-like member 58. The outer end of the bar cap member 53 is preferably curved or arcuate-shaped, as at 59, for a purpose hereinafter to be described. There is loosely disposed on the outer end of the bar cap 53 a reeling or piercing plug 60 having a chamber 61 arranged therewithin which is adapted to act as a reservoir. In the inner end of the reeling plug 60 there is arranged an axial opening 62 which communicates with the chamber 61 therewithin and in which the nozzle-like member 58 is disposed. The outer end of the opening 62 is preferably outwardly beveled as at 63 and is seated against the arcuate surface 59 of the bar cap with which it is adapted to cooperate so as to provide a universal movement thereof on the end of the bar cap. In the outer end of the reeling plug there is also arranged an axial opening 64 for delivering the lubricant from the reservoir or chamber 61 into the pipe P or other tubular workpiece.

It will be understood that when in operation, the mandrel bar 7, the spindle 5, together with the supporting member 10 and cooling fluid pipe 21 carried thereby, and the lubricant conveying pipe 40, all revolve together and that the cooling fluid, usually water, is continually introduced into the passageway 36 in the stuffing box 29 by means of the inlet pipe 38 and passes through the axial opening 20 in the supporting member 10 into and through the conveying pipe 21 through the openings 57 in the outer end thereof into and through the passageways 56 of the bar cap 53 into the interior of the mandrel bar to cool the same. The water or cooling fluid then flows back on the outer side of the cooling fluid pipe in the space between the cooling pipe and the mandrel bar through the spindle 5 and out through the openings or passageways 28 in the flange 15 of the supporting member 10 to a suitable drain or other fluid discharge receiving means. It will be understood that the lubricant, usually oil, is continually introduced into and through the passageway 48 in the stuffing box 29 from the lubricant supply pipe 49 into and through chamber 51 of cover 50, into and through the lubricant conveying pipe 40, and out through the nozzle-like member 58 into the chamber or reservoir 61 in the reeling plug 60. The lubricant then passes from the chamber 61 out through the opening 64 and into the interior of the pipe or other tubular workpiece on the outer side of the reeling thereby lubricating the same, whereby a lubricant is disposed between the reeling or piercing plug and the workpiece at all times.

As a result of my invention, it will be seen that there is provided not only a construction whereby both the cooling fluid and lubricant conveying pipes can be easily and quickly replaced, should it be necessary, but also a construction wherein both the cooling and lubricant pipes are permitted to move relative to the mandrel bar and spindle thereby eliminating the danger of breakage thereof. Furthermore, there is provided a construction wherein the cooling fluid and lubricant pipe supporting member is yieldably mounted whereby movement is permitted between this member and the spindle so as to prevent breakage of the supporting member and the pipes carried thereby. It will also be seen that there is provided a construction wherein the piercing point or reeling plug can move relative to the mandrel bar so that the point or plug can follow the movement of the pipe or workpiece, thereby eliminating any undue strain upon the apparatus and the danger of any damage thereto. As a consequence, it will be seen that sagging and whipping actions of both the cooling and lubricant conveying pipes are reduced to a minimum, and the movements of both the pipes are made to conform substantially to the movements of the mandrel bar.

While I have shown and described one specific embodiment of my invention, it will be understood that this embodiment is merely for the purpose of illustration and description and that various other forms may be devised within the scope of my invention, as defined in the appended claims.

I claim:

1. Means for supplying a cooling fluid to the interior of a rotatable hollow mandrel bar and a lubricant to the interior of the pipe to be worked upon including, in combination, a supporting member arranged on the inner end of the mandrel bar and which is adapted to rotate therewith, a longitudinally extending pipe carried by said supporting member and extending into said mandrel bar, means movably connecting said pipe to said supporting member so that the same is movable relative thereto during the rotation thereof, means for supplying a cooling fluid into and through said pipe into said mandrel bar, a second pipe telescopically arranged within said first mentioned pipe and extending to the outer end of said mandrel and with which it is adapted to rotate, and means arranged at the inner end of said second mentioned pipe for supplying a lubricant into and through said pipe which is adapted to be delivered to the outer end of said mandrel bar.

2. Means for supplying a cooling fluid to the interior of a rotatable hollow mandrel bar and a lubricant to the interior of the pipe to be worked upon including, in combination, a supporting member arranged on the inner end of the mandrel bar and which is adapted to rotate therewith, a longitudinally extending pipe carried by said supporting member and extending into said mandrel bar, means movably connecting said pipe to said supporting member so that the same is movable relative thereto during the rotation thereof, means for supplying a cooling fluid into and through said pipe into said mandrel bar, a second pipe telescopically arranged within said first mentioned pipe and extending to the outer end of said mandrel bar, a stuffing box in which the inner free end of said last mentioned pipe is rotatably disposed, means arranged with said stuffing box for supplying a lubricant therethrough into the inner end of said last mentioned pipe, and means carried by said stuffing box which fits around the outer surface of said last mentioned pipe to securely seal the inner end thereof against leakage of the lubricant.

3. Means for supplying a cooling fluid to the interior of a rotatable hollow mandrel bar and a lubricant to the interior of the pipe to be worked upon including, in combination, a supporting member arranged on the inner end of the mandrel bar, a longitudinally extending pipe carried by said supporting member and extending into said mandrel bar, a stuffing box means in which the outer free end of the supporting member is rotatably disposed, means arranged with said stuffing box for supplying a cooling fluid therethrough into the inner end of said pipe, means carried by said stuffing box which fits around the outer surface of said supporting member to securely seal the inner end thereof against leakage of the cooling fluid, a second pipe telescopically arranged within said first mentioned pipe and extending to the outer end of said mandrel bar, a similar stuffing box means in which the inner free end of said last mentioned pipe is rotatably disposed, means arranged with said last mentioned stuffing box means for supplying a lubricant therethrough into the inner end of said last mentioned pipe, and means carried by said last mentioned stuffing box which fits around the outer surface of said last mentioned pipe to securely seal the outer end thereof against leakage of the lubricant.

4. Means for supplying a cooling fluid to the interior of a rotatable hollow mandrel bar and a lubricant to the interior of the pipe to be worked upon, as defined in claim 1, including a plug disposed on the outer end of the mandrel bar having passages arranged therein communicating with the cooling fluid pipe for conveying the cooling fluid to the interior of the mandrel bar, and means arranged beyond said plug and the outer end of said mandrel bar communicating with the outer end of the lubricant conveying pipe for conveying the lubricant to the interior of the pipe to be worked upon.

5. Means for supplying a cooling fluid to the interior of a rotatable hollow mandrel bar and a lubricant to the interior of the pipe to be worked upon, as defined in claim 1, including a plug disposed on the outer end of the mandrel bar having passages arranged therein communicating with the cooling fluid pipe for conveying the cooling fluid to the interior of the mandrel bar, and a reeling plug arranged on the outer end of said last mentioned plug and mandrel bar, said reeling plug having a chamber arranged therein which acts as a reservoir and which communicates with the outer end of the lubricant conveying pipe which extends through said first mentioned plug and having a passageway arranged in the outer end thereof which communicates with said chamber for conveying the lubricant therefrom into the interior of the pipe to be worked upon.

6. Means for supplying a cooling fluid to the interior of a rotatable hollow mandrel bar and a lubricant to the interior of the pipe to be worked upon, as defined in claim 1, including means arranged on the outer end of the mandrel bar for conveying the cooling fluid from the outer end of the cooling fluid pipe back into the interior of said mandrel bar on the outer side of said cooling fluid pipe so as to cool the mandrel bar, with the lubricant conveying pipe extending through said last mentioned means, and means arranged beyond said last mentioned means communicating with the end of said lubricant conveying pipe for conveying the lubricant into the interior of the pipe to be worked upon.

7. Means for supplying a cooling fluid to the interior of a rotatable hollow mandrel bar and a lubricant to the interior of the pipe to be worked upon, as defined in claim 1, including means arranged on the outer end of the mandrel bar for conveying the cooling fluid from the outer end of the cooling fluid pipe back into the interior of said mandrel bar on the outer side of said cooling fluid pipe so as to cool the mandrel bar, with the lubricant conveying pipe extending through said last mentioned means, and a reeling plug loosely disposed on the outer end of said mandrel bar beyond said last mentioned means, said reeling plug having a chamber arranged therein which acts as a reservoir and which communicates with the outer end of the lubricant conveying pipe and having a passageway arranged in the outer end thereof which communicates with the chamber within the plug for conveying the lubricant therefrom into the interior of the pipe to be worked upon.

8. Means for supplying a cooling fluid to the interior of a rotatable hollow mandrel bar and a lubricant to the interior of the pipe to be worked upon, as defined in claim 1, including a plug arranged on the outer end of the mandrel bar having passages arranged therein communicating with the end of the cooling fluid pipe for conveying the cooling fluid back into the interior of said mandrel bar on the outer side of said cooling fluid pipe so as to cool the mandrel bar with the lubricant conveying pipe extending through said plug, and a reeling plug loosely disposed on the outer side of said first mentioned plug beyond the end of said mandrel bar, said reeling plug having a chamber arranged therein which acts as a reservoir and which communicates with the outer end of said lubricant conveying pipe and having a passageway arranged in the outer end thereof which communicates with the chamber in said reeling plug for conveying the lubricant therefrom into the interior of the pipe to be worked upon, said reeling plug being so constructed and arranged as to have a universal movement relative to said first mentioned plug and the outer end of said mandrel bar.

9. Means for supplying a cooling fluid to the interior of a rotatable hollow mandrel bar and a lubricant to the interior of the pipe to be worked upon, as defined in claim 1, wherein the means for removably connecting the cooling fluid conveying pipe to the supporting member consists of a key arranged in an opening through said supporting member which cooperates loosely with a key-way arranged in the side wall of said pipe whereby the cooling fluid pipe is rotated thereby and movable relative thereto during such rotatable movement.

10. Means for supplying a cooling fluid to the interior of a rotatable hollow mandrel bar and a lubricant to the interior of the pipe to be worked upon, as defined in claim 1, wherein the means for removably connecting the cooling fluid conveying pipe to the supporting member consists of a key arranged in an opening through said supporting member which cooperates loosely with a key-way arranged in the side wall of said pipe whereby the cooling fluid pipe is rotated thereby and movable relative thereto during such rotatable movement, and includes resilient means carried by the supporting member adjacent the outer end thereof and arranged around the periphery of said cooling fluid pipe, said resilient means adapted to seal that end of the opening in said supporting member against leakage of the cooling fluid from around said cooling fluid pipe and to aid in yieldably supporting said cooling fluid pipe so as to permit movement thereof relative to said supporting member.

11. Means for supplying a cooling fluid to the interior of a rotatable hollow mandrel bar and a lubricant to the interior of the pipe to be worked upon including, in combination, a supporting member arranged on the inner end of the mandrel having an opening arranged axially therethrough and which is adapted to rotate with said mandrel, a longitudinally extending pipe arranged in the opening of said supporting member and extending into said mandrel bar, means movably connecting said pipe to said supporting member so that the same is movable relative thereto during the rotation thereof, a stuffing box in which the inner free end of said supporting member is rotatably disposed, means arranged with said stuffing box for supplying a cooling fluid to the inner end of the opening through said supporting member whereby said cooling fluid is conveyed therethrough into and through said cooling fluid pipe, a second pipe telescopically arranged through the opening in said supporting member and within said first mentioned pipe and extending to the outer end of said mandrel bar and with which it is adapted to rotate, and means arranged at the inner end of said second mentioned pipe for supplying a lubricant into and through said pipe and which is adapted to be delivered to the outer end of said mandrel bar.

HARRY OTTINGER.